(12) United States Patent  
De Martino

(10) Patent No.: US 12,319,380 B2  
(45) Date of Patent: Jun. 3, 2025

(54) HANDLEBAR ARRANGEMENT HAVING AN IGNITION STEERING LOCK FOR A TILTING VEHICLE

(71) Applicant: Bayerische Motoren Werke Aktiengesellschaft, Munich (DE)

(72) Inventor: Claudio De Martino, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 463 days.

(21) Appl. No.: 17/792,531

(22) PCT Filed: Feb. 4, 2021

(86) PCT No.: PCT/EP2021/052582  
§ 371 (c)(1),  
(2) Date: Jul. 13, 2022

(87) PCT Pub. No.: WO2021/197688  
PCT Pub. Date: Oct. 7, 2021

(65) Prior Publication Data  
US 2023/0059222 A1 Feb. 23, 2023

(30) Foreign Application Priority Data

Mar. 31, 2020 (DE) .................... 10 2020 108 822.1

(51) Int. Cl.  
*B62K 21/04* (2006.01)  
*B60R 25/02* (2013.01)

(52) U.S. Cl.  
CPC ............. *B62K 21/04* (2013.01); *B60R 25/02* (2013.01); *B60R 2325/306* (2013.01)

(58) Field of Classification Search  
CPC .... B62K 21/04; B60R 25/02; B60R 2325/306  
See application file for complete search history.

(56) References Cited

U.S. PATENT DOCUMENTS 7,147,281 B2 * 12/2006 Michisaka ................. B62J 1/12  
                                                                                      297/188.1  
8,041,507 B2 * 10/2011 Ieda ........................ B62K 19/30  
                                                                                      248/214

(Continued)

FOREIGN PATENT DOCUMENTS

| CN | 1495086 A | 5/2004 |
|---|---|---|
| CN | 1530279 A | 9/2004 |

(Continued)

OTHER PUBLICATIONS

International Search Report (PCT/ISA/210) issued in PCT Application No. PCT/EP2021/052582 dated Apr. 15, 2021 with English translation (four (4) pages).

(Continued)

*Primary Examiner* — Bryan A Evans  
(74) *Attorney, Agent, or Firm* — Crowell & Moring LLP

(57) ABSTRACT

A handlebar arrangement for a vehicle is provided, having a fork bridge, an ignition steering lock and a retention member or holder to which the ignition steering lock is fastened. The retention member is fixed on the fork bridge by fasteners, wherein elastic decoupling elements for shock and/or vibration decoupling are arranged between the fork bridge and the retention member.

11 Claims, 2 Drawing Sheets

(56) References Cited

U.S. PATENT DOCUMENTS

2005/0012296 A1  1/2005  Wimmer
2019/0301903 A1  10/2019 Hamaguchi et al.

FOREIGN PATENT DOCUMENTS

| CN | 101544253 A | 9/2009 |
|---|---|---|
| CN | 203306083 U | 11/2013 |
| DE | 10 2010 061 640 A1 | 7/2012 |
| DE | 10 2019 106 809 A1 | 11/2019 |
| DE | 10 2018 128 430 A1 | 5/2020 |
| JP | 2006-231983 A | 9/2006 |
| JP | 2009241620 A * | 10/2009 |
| WO | WO 2019/064699 A1 | 4/2019 |

OTHER PUBLICATIONS

German-language Written Opinion (PCT/ISA/237) issued in PCT Application No. PCT/EP2021/052582 dated Apr. 15, 2021 (five (5) pages).

German-language Search Report issued in German Application No. 10 2020 108 822.1 dated Dec. 1, 2020 with partial English translation (20 pages).

English translation of Chinese-language Office Action issued in Chinese Application No. 202180008513.5 dated Sep. 1, 2023 (6 pages).

\* cited by examiner

HANDLEBAR ARRANGEMENT HAVING AN IGNITION STEERING LOCK FOR A TILTING VEHICLE

BACKGROUND AND SUMMARY

The invention relates to a handlebar arrangement for a vehicle having an ignition steering lock and a correspondingly equipped vehicle having a corresponding handlebar arrangement.

In vehicles, in particular in tilting vehicles, such as motorcycles, ignition steering locks are generally directly installed in a state secured to the structure. The securing is in this respect independent of whether it is a mechanical ignition steering lock having a key or an electrical ignition steering lock having a remote control, and is generally produced on the vehicle frame or on an upper fork bridge of the front wheel fork. The disadvantage of such fastening of the ignition steering lock is that, as a result of the screw connection which is secured to the structure in both cases, impacts and/or vibrations which arise, for example, from the engine or from travelling over uneven roads, are introduced directly into the ignition steering lock.

As a result of these impacts or vibrations, in unfavorable cases a defect of the ignition steering lock may occur. This occurs particularly in an electronic ignition steering lock so that for specific vehicles and application areas an ignition steering lock with a remote control cannot be provided as a result of impact or vibration-related defects.

A decoupled arrangement which is secured to the frame for reducing a transmission of impacts and vibrations to an ignition steering lock on a motorcycle is described, for example, in DE 10 2018 128 430 A1.

An object of the present invention is to provide an alternative apparatus for fixing an ignition steering lock, in particular on a tilting vehicle with a retention member (holder), which minimizes the impact or vibration-related failures of the ignition steering lock and enables the use of an electrical ignition steering lock having a remote control also in vehicles which are subjected to increased impacts or vibrations.

This object is achieved by a handlebar arrangement, and a vehicle having such a corresponding handlebar arrangement, according to the independent claims.

Accordingly, a handlebar arrangement for a vehicle is provided, having a handlebar element, an ignition steering lock, and a retention member to which the ignition steering lock is secured. The retention member is fixed to the handlebar element by securing elements, and resilient (elastic) decoupling elements for impact and/or vibration decoupling are arranged between the handlebar element and the retention member. The handlebar element is a fork bridge.

In particular, all vehicles which have a corresponding handlebar arrangement and which have a fork bridge are considered as vehicles in the context of this description. These include, for example, so-called tilting vehicles, that is to say, inter alia motorcycles or motorcycle-like motor vehicles, such as motor scooters, in particular tiltable two-, three- or four-wheeled motor scooters, scooters or the like. However, a use with other motor-driven vehicles, such as, for example, motor-driven bicycles, tricycles or quad bikes which may also have a corresponding handlebar arrangement with a fork bridge is also possible.

Fork bridges are known in these vehicles as part of the front wheel suspension. In this instance, two fork bridges, an upper and a lower fork bridge, are used in most cases. These bridges generally have one or two receiving members for suspension struts (also referred to as fork legs) of the front wheel suspension. In addition, they have a receiving member for a steering column which produces a rotationally movable connection to the control head of a vehicle structure, such as, for example, a vehicle frame.

As described, the ignition steering lock is thus connected indirectly by means of the retention member to the handlebar element of the vehicle, the fork bridge. In a manner described in other words, this means that the retention member is provided as an adapter between the ignition steering lock, on the one hand, and the handlebar element, on the other hand. To this end, the ignition steering lock is exclusively secured with the retention member and the retention member is in turn secured to the handlebar element using the securing elements.

In addition, there are provided, between the retention member and the handlebar element, the resilient decoupling elements which decouple the retention member with respect to the handlebar element in order to prevent or at least to reduce a transmission of vibrations (that is to say, in particular with respect to impacts and/or vibrations).

In this instance, it is advantageous that, as a result of the resilient decoupling elements, impacts and/or vibrations which occur during operation of the vehicle are not transmitted immediately and directly to the ignition steering lock, but instead are damped or reduced initially by the decoupling elements and the retention member. In this manner, a higher level of failure reliability and a larger application range of the ignition steering lock are achieved, for example, also in the off-road area or with high-speed motors which may or may not be provided with compensation elements, where significantly more powerful impacts and/or vibrations may be anticipated. It is particularly advantageous that the apparatus can be used with all of the vehicles mentioned and the vibration profiles thereof since they can be adapted to the respective requirements by means of the Shore hardness or the modulus of elasticity of the decoupling elements. It is possible to use, for example, rubber grommets, rubber rings, rubber bushes, or rubber disks as decoupling elements.

According to an advantageous embodiment, there is provision for the resilient decoupling elements to abut in a mounted state directly against the retention member. By means of this arrangement, the impacts and/or vibrations which result from the operation of the vehicle are damped or reduced in an optimum manner. This results from the fact that the resilient decoupling elements absorb these vibrations and/or impacts directly from the vehicle and the structure thereof, they are then reduced as a result of the decoupling and the resilience resulting from the decoupling elements, and only subsequently directed to the ignition steering lock. Preferably, the decoupling elements are configured in such a manner that they are not only arranged between the retention member and the handlebar element but also extend between the retention member and the respective securing elements in order to also decouple these two components from each other in order to prevent or at least reduce a vibration transmission. For example, the rubber bushes mentioned are particularly suitable for this purpose.

Preferably, there are provided on the retention member defined securing portions at which the retention member can be fixed to the handlebar element of the vehicle using the securing elements. The retention member and consequently also the ignition steering lock can thereby be fixed to the vehicle in a simple manner. Screws are preferably used as securing elements. However, a locking connection using securing elements which are in the form of clips is also possible.

For example, the retention member can be fixed to a lower side or an upper side of the fork bridge. The securing to the lower side enables an arrangement of the retention member and the securing elements which is unobtrusive for the user since they are positioned at the lower side facing away from the user. The accessibility to the ignition steering lock can thereby be ensured in that it extends in the direction of the driver through a corresponding recess in the fork bridge and is consequently readily accessible for the driver.

An arrangement at the upper side is also possible, this arrangement in particular provides easy accessibility to the entire retention member and the securing elements.

Furthermore, a positioning of the securing portions has significant effects on the impact and/or vibration decoupling or transmission of the impacts and/or vibrations to the ignition steering lock. Optimum results can be achieved when a clamping surface of the securing portions is as large as possible. There is defined in this instance as a clamping surface the face which is delimited when all the securing portions are connected to their adjacent securing portions with a notional line.

In both cases, for example, at least two securing portions may have a greater spacing with respect to each other than two additional securing portions with respect to each other.

According to one embodiment, the retention member may be constructed in a substantially U-shaped, rectangular or trapezoidal manner.

Preferably, the ignition steering lock is connected to a first leg and an opposing second leg of the retention member. It has been found to be particularly advantageous for the connection locations of the ignition steering lock to be positioned in this case with the two legs in such a manner that a notional connection line of the connection locations is located within the clamping surface, that is to say, within the securing portions.

Alternatively, the retention member may comprise two retention portions which are constructed separately from each other and which are arranged with spacing from each other, wherein the ignition steering lock is arranged between the two retention portions and is connected to both retention portions.

Preferably, at least one of the two or both retention portions are in the form of a web or webs. This affords the possibility of providing the securing portions of the webs in each case in the region of the ends thereof and connecting them at that location to the handlebar element. Accordingly, the connection locations of the ignition steering lock are positioned with the two webs in such a manner that a notional connection line of the two connection locations is located within the corresponding clamping surface, that is to say, between the securing portions. In this manner, the most optimum lever relationship possible for supporting the retention member on the handlebar element can be achieved.

Furthermore, a vehicle having a handlebar arrangement is provided, wherein the handlebar arrangement is constructed according to this description.

The invention is explained in greater detail with reference to two embodiments and the drawings.

DETAILED DESCRIPTION OF THE DRAWINGS

Figure 1:
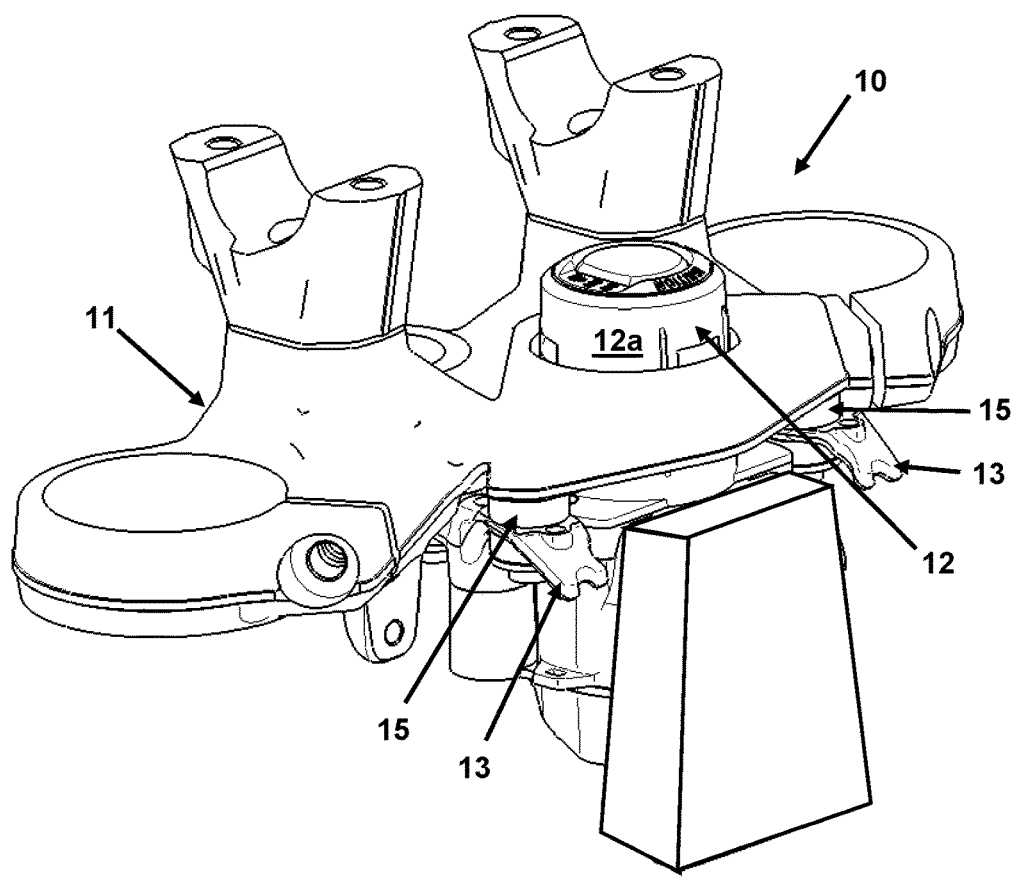
FIG. 1 is a perspective view of a handlebar arrangement according to the description.

FIG. 1 shows a perspective view of a handlebar arrangement 10 for a vehicle which is, for example, in the form of a motorcycle (not illustrated in greater detail) having a handlebar element 11, an ignition steering lock 12 and a retention member 13 to which the ignition steering lock 12 is secured, wherein the handlebar element 11 is a fork bridge 11 (both terms are used synonymously below). Of course, the vehicle may also be in the form of a different vehicle in the context of the description.

Figure 2:
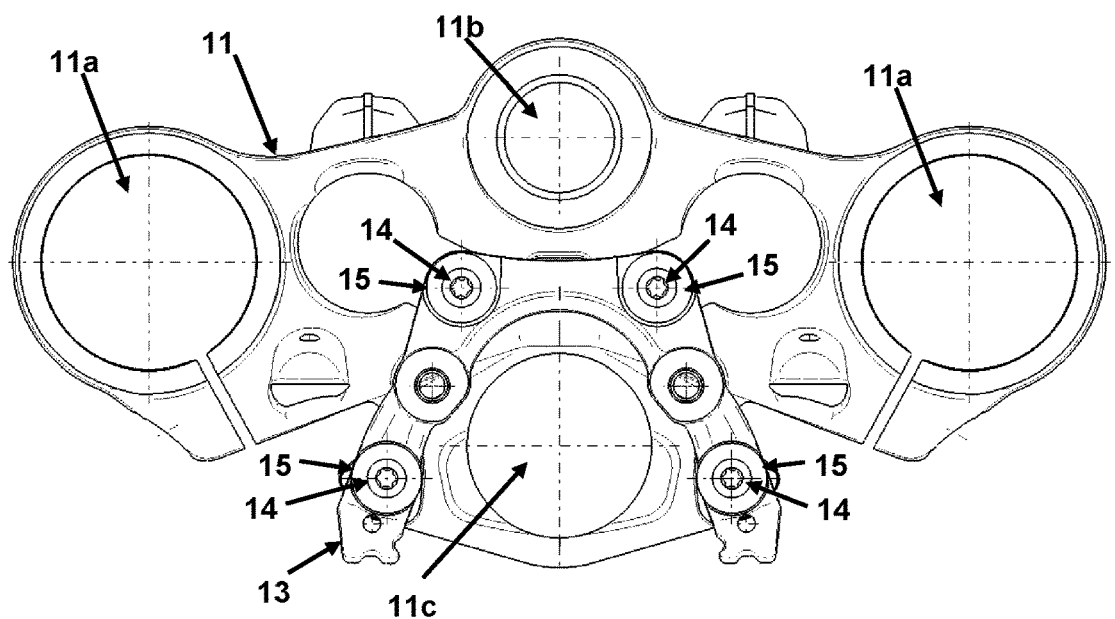
FIG. 2 is a plan view of a lower side of a handlebar element of the handlebar arrangement according to FIG. 1.

As can be seen in particular in the view illustrated in FIG. 2 of a lower side of the handlebar element 11, the retention member 13 is fixed, for example, at four defined securing portions 16 using a securing element 14 which is in the form of a screw, to the lower side of the handlebar element 11. Of course, more or fewer than four securing portions 16 with a securing element 14 in each case may be provided.

In addition, resilient decoupling elements 15 for impact and/or vibration decoupling are arranged between the handlebar element 11 and the retention member 13. The decoupling elements 15 are—as can be seen in FIG. 1—configured in such a manner that, in addition to this arrangement between the retention member 13 and the handlebar element 11, they further also extend between the retention member 13 and the respective securing elements 14 in order to decouple the mentioned components from each other in order to prevent or at least reduce a vibration transmission. For example, rubber rings, rubber bushes, or rubber disks can be used as decoupling elements 15.

The fork bridge 11 has two receiving members 11a for two suspension struts (not illustrated) (also referred to as fork legs) of a front wheel suspension of the motorcycle, that is to say the front wheel fork. In addition, there is provided on the fork bridge 11 a receiving member 11b for a steering column (not illustrated) which produces a rotationally movable connection to a control head of a vehicle structure, such as, for example, a motorcycle frame.

As described above, the ignition steering lock 12 is connected via the retention member 13 only indirectly to the fork bridge 11. To this end, the ignition steering lock 12 is exclusively secured by means of the retention member 13 and this retention member 13 is in turn secured using four securing elements 14 to the lower side of the handlebar element 11.

This described securing of the retention member 13 to the lower side of the handlebar element 11 enables an arrangement of the retention member 13 and the securing elements 14 which is unobtrusive for the user since they are positioned at the lower side facing away from the user. The accessibility to the ignition steering lock 12 is ensured in that it extends with a, for example, cylindrical portion 12a in the direction of the driver through a corresponding recess 11c in the fork bridge 11 and is consequently readily accessible for the driver.

The illustrated positioning of the securing portions 16 has advantageous effects on the impact and/or vibration decoupling or transmission of the impacts and/or vibrations to the ignition steering lock 12. A clamping surface A of the securing portions 16 is selected to be as large as possible. There is defined in this instance as a clamping surface A the face which is delimited when all the securing portions 16 are connected to their adjacent securing portions 16 with a notional line.

Figure 3:
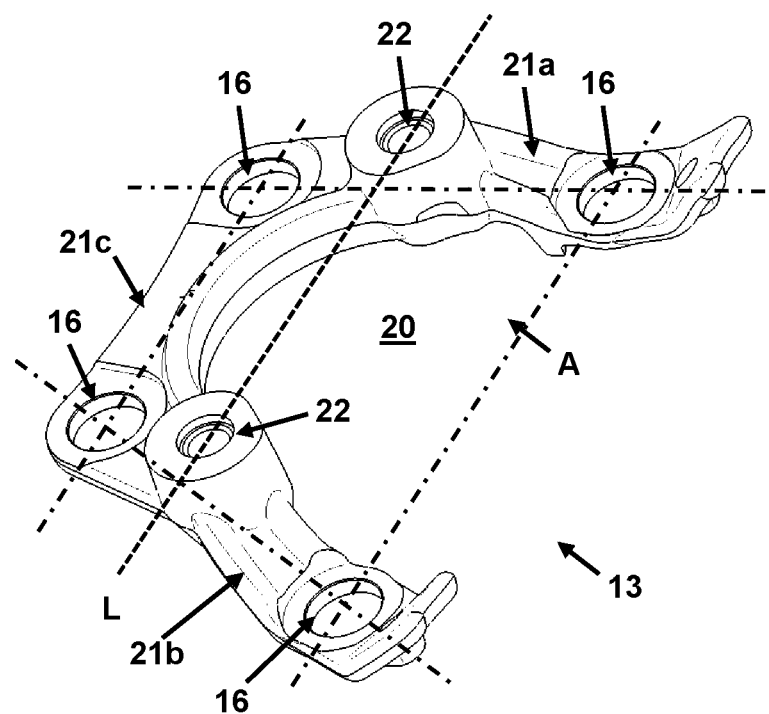
FIG. 3 is a perspective view of a first embodiment of a first retention member for the handlebar arrangement according to FIG. 1.

FIG. 3 shows the retention member 13 according to a first embodiment in detail. The retention member 13 has a recess 20 in which the ignition steering lock 12 is inserted.

The retention member 13 illustrated according to the first embodiment is constructed in a substantially U-shaped manner and has two legs 21a, 21b which are spaced apart from each other, wherein one end of a first leg 21a is connected to an adjacent end of a second leg 21b by means of a connection portion 21c and consequently forms the U-shape with a recess 20 which is defined between the two legs 21a, 21b. In addition, a second end of the first leg 21a may also be connected to an adjacent second end of the second leg 21b so that a rectangular shape or trapezoidal shape is produced (not illustrated).

In the embodiment illustrated, the ignition steering lock 12 is connected in each case at a connection location 22 to the first leg 21a and the opposing second leg 21b of the retention member 13. Each of the two legs 21a, 21b is thus associated with one of the two connection locations 22 for connection to the ignition steering lock 12 (see FIG. 3). Optionally, the two connection locations 22 are positioned on the two legs 21a, 21b in such a manner that a notional connection line L is located within the clamping surface A, that is to say, between the securing portions 16.

Figure 4:
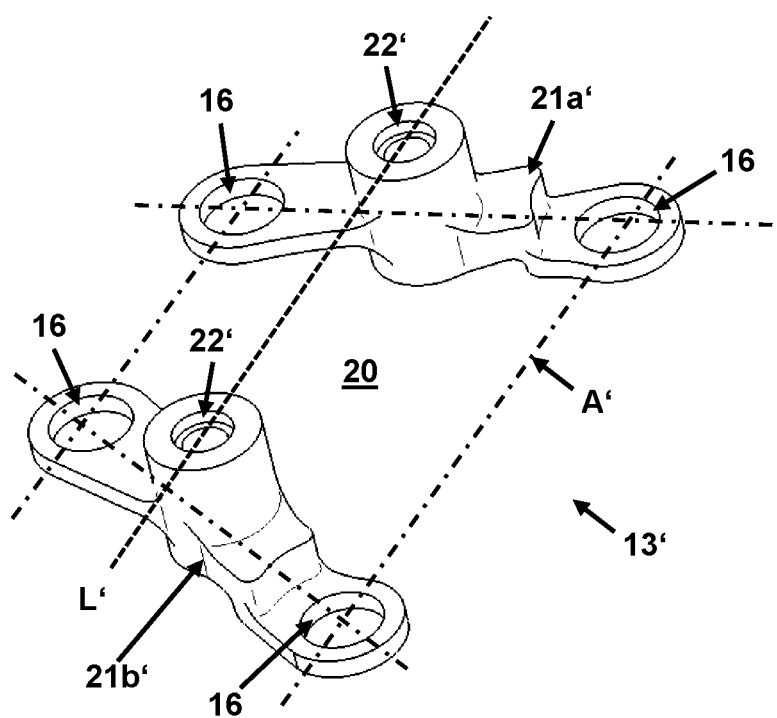
FIG. 4 is a perspective view of a second embodiment of a second retention member for the handlebar arrangement according to FIG. 1.

According to a slightly modified second embodiment which is illustrated in FIG. 4, the retention member 13' comprises two retention portions 21a', 21b' which are constructed separately from each other and which are also arranged with spacing from each other but not connected to each other. The ignition steering lock 12 can accordingly be arranged in the recess 20 formed between the two retention portions 21a', 21b' and be connected to both retention portions 21a', 21b'.

As illustrated in FIG. 4, both retention portions 21a', 21b' are in the form of webs.

In a similar manner to the first embodiment illustrated in FIG. 3, in this instance two connection locations 22' for connection to the ignition steering lock 12 are also provided and positioned on the two webs 21a', 21b' in such a manner that a notional connection line L' is located within the corresponding clamping surface A, that is to say, between the securing portions 16.

What is claimed is:

1. A handlebar arrangement for a vehicle, comprising:
a handlebar element of the vehicle;
an ignition steering lock;
a retention member to which the ignition steering lock is secured, wherein the retention member is fixable to the handlebar element by securing elements; and
resilient decoupling elements for impact and/or vibration decoupling arranged between the handlebar element and the retention member,
wherein the handlebar element is a fork bridge; and,
wherein the ignition steering lock is only indirectly connected to the fork bridge via the retention member.

2. The handlebar arrangement according to claim 1, wherein
the retention member is fixed to a lower side or an upper side of the fork bridge.

3. The handlebar arrangement according to claim 1, wherein
the retention member has a recess in which the ignition steering lock is inserted.

4. The handlebar arrangement according to claim 1, wherein
the retention member is constructed in a substantially U-shaped, rectangular or trapezoidal manner.

5. The handlebar arrangement according to claim 4, wherein
the ignition steering lock is connected to a first leg and an opposing second leg of the retention member.

6. The handlebar arrangement according to claim 1, wherein
the retention member comprises two retention portions which are constructed separately from each other and which are arranged with spacing from each other, and
the ignition steering lock is arranged between the two retention portions and is connected to both retention portions.

7. The handlebar arrangement according to claim 6, wherein at least one of the two, or both, retention portions are in a web form.

8. A vehicle comprising the handlebar arrangement according to claim 1.

9. The handlebar arrangement according to claim 1, wherein the ignition steering lock is exclusively secured with the retention member, and the retention member is in turn secured to the handlebar element using securing elements.

10. The handlebar arrangement according to claim 1, wherein the resilient decoupling elements abut in a a mounted state directly against the retention member.

11. The handlebar arrangement according to claim 1, wherein the retention member is fixed to a lower side of the fork bridge, and the ignition steering lock extends in a direction of a driver through a corresponding recess in the fork bridge.

* * * * *